United States Patent [19]

Mergell

[11] Patent Number: 4,942,283
[45] Date of Patent: Jul. 17, 1990

[54] STUD WELDING APPARATUS

[75] Inventor: Bruno Mergell, Hainbuchenweg, Fed. Rep. of Germany

[73] Assignee: Emhart Industries, Inc., Towson, Md.

[21] Appl. No.: 419,304

[22] Filed: Oct. 10, 1989

[51] Int. Cl.⁵ .............................................. B23K 9/20
[52] U.S. Cl. .................................................... 219/98
[58] Field of Search ...................... 219/98, 99; 369/13

[56] References Cited

U.S. PATENT DOCUMENTS

| | | | |
|---|---|---|---|
| 531,275 | 12/1896 | Radomski | 369/13 |
| 3,526,744 | 9/1970 | Ehrlich | 219/99 |
| 4,163,888 | 8/1979 | Ettinger | 219/98 |

Primary Examiner—Clifford C. Shaw
Attorney, Agent, or Firm—Spencer T. Smith

[57] ABSTRACT

Stud welding apparatus comprising a housing, a spring-loaded stud holder which holds a welding stud in welding position by its resilient restoring force, a feed channel through which the stud is delivered into a substantially cylindrical space within the stud holder, and loading means which is movable relatively to the welding stud by a pneumatic piston and which presses the stud into the stud holder against the resilient restoring force, characterized in that the loading means is pivotally attached about an axis fixed in relation to the housing, that at least one lever is disposed between the loading means and the pneumatic piston whereby the pivotal point of said lever on the loading means is spaced by a small distance from its axis of rotation and that loading means, lever and the movement of the pneumatic piston are coordinated so that loading means is pivotable between a loading position, in which the feed channel is cleared, and a position in which the loading means presses stud into the stud holder.

3 Claims, 2 Drawing Sheets

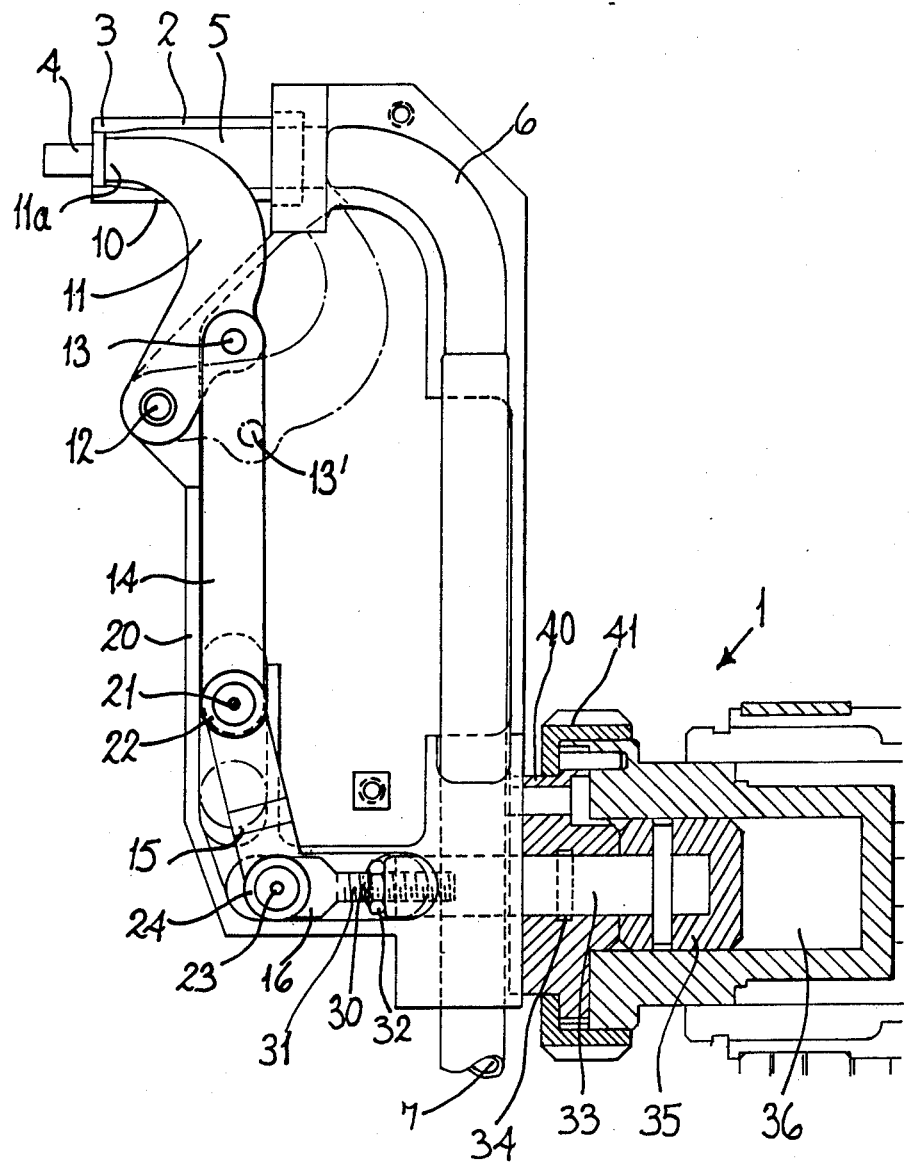
Fig_1

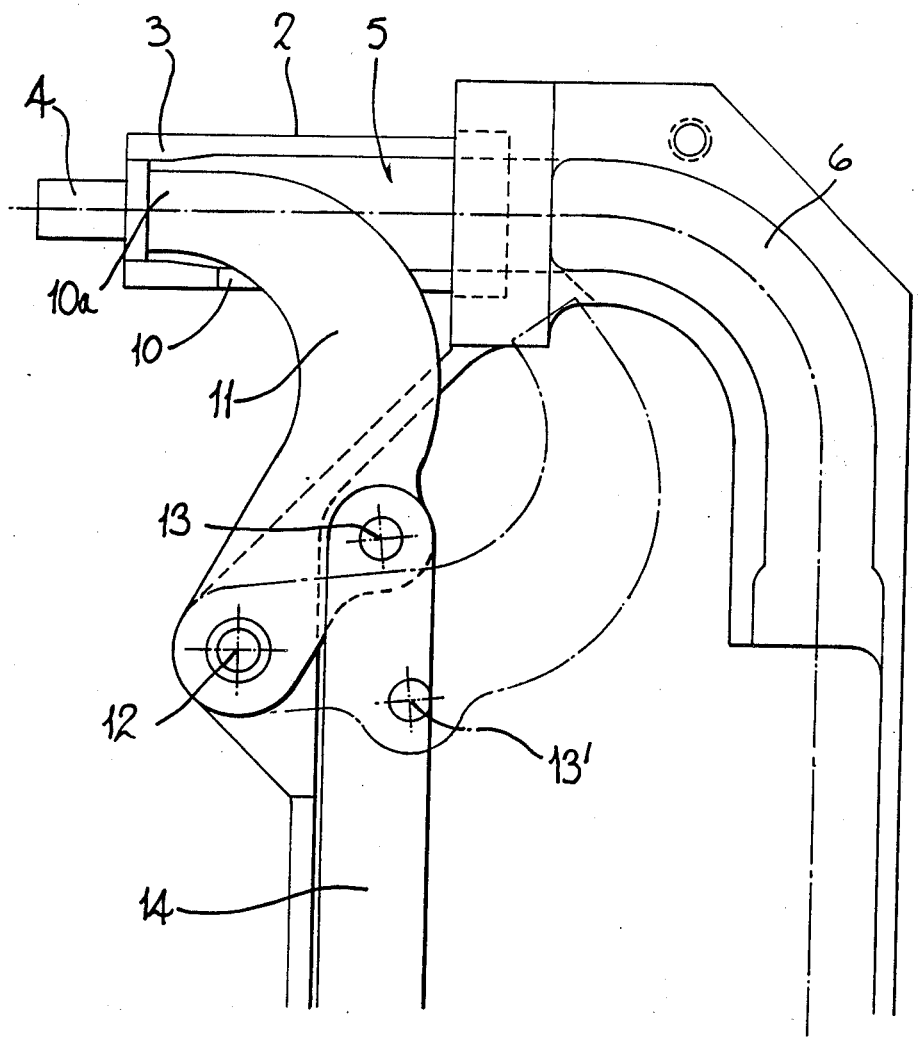
Fig_2

STUD WELDING APPARATUS

BACKGROUND OF THE INVENTION

The present invention is concerned with stud welding apparatus for the automatic processing of welding studs, comprising a housing, a spring-loaded stud holder which holds the welding stud in welding position by its resilient restoring force, a feed channel through which the stud is delivered into a substantially cylindrical space within the stud holder, and loading means which is movable relatively to the welding stud by a pneumatic piston and which presses said stud into the stud holder against the resilient restoring force.

Stud welding apparatuses of the kind referred to above are known in the prior art. Such stud welding apparatus is used, for example, in the automobile industry to weld studs which carry, for example, fixing parts for brake lines; etc to the automobile body.

There are two fundamentally different electric welding processes used in such apparatus, which differ in the method as to how the arc is produced.

The first welding method is described as 'arc ignition'. In this method, the stud welding apparatus, together with the welding stud pressed into the stud holder, is first put in contact with the automobile body and a (in some cases low) current passed through the welding stud so as to create a short circuit. The stud welding apparatus is then moved away from the automobile body by a predetermined distance (often shown on a distance indicator on the stud welding apparatus). This movement away from contact produces an arc, which is used for the welding process. After the ignition of the arc, the welding current is increased as required.

In another method, described as 'apex ignition', the welding stud has a small point facing the automobile body. The welding stud is put in contact with the automobile body under full welding current, so that the point rapidly melts because of the high current flowing within it, and the arc necessary for the welding process is created between the welding stud and the automobile body. In this method it is important that the welding stud is moved relatively far away from the automobile body before ignition.

German Specification No. DE-OS 31 05 987 shows a stud welding apparatus in which the loading means consists of a push rod directly attached to a pneumatically-operated thrust piston. As soon as compressed air is delivered to the cylinder in which the thrust piston is disposed, the thrust piston is moved towards the welding stud, hits it and then pushes it against the resilient restoring force of the stud holder into the welding position.

Similar apparatus is shown in German Specification No. DE-OS 26 04 065. Again, a driving rod is provided which is connected to a pneumatic piston and which pushes a welding stud against the resilient restoring force of the stud holder into the welding position. It differs from the preceding example in that in this case a compression spring is additionally provided which is compressed by the movement of the pneumatic piston towards the stud holder, and which returns the driving rod and the pneumatic piston into the starting piston after the stud has been pressed into its holder.

A different kind of stud welding apparatus is shown in German Specification No. DE-GM 85 11 543. This apparatus is designed to carry out the apex ignition process. In order to provide an adequate distance from the surface to be welded, this apparatus is designed so that the stud holder can move back by a greater distance from the welding face. Unlike the previously-described stud welding apparatus, there is no driving rod present, but there a catch is arranged in the feed channel which swings out or is swung out by force when a stud is inserted into the feed channel and against which the stud strikes when the stud holder is moved towards this catch. The stud is thus stopped by the catch and the force required for the pressing-in of the welding stud is provided by the backmovement of the stud holder.

Known stud welding apparatuses have disadvantages which arise from the kinetics of the loading process. In virtually all the prior art, the pneumatic piston first accelerates the driving rod or else the stud holder until it finally abuts against the welding stud. At this point the piston, together with the driving rod connected thereto, (the stud holder in the DE-GM 85 11 543) has maximum kinetic energy. At the same time, the force which is required in order to open up the stud holder against its resilient restoring forces is, in this position, according to the generally accepted principles of elasticity, at its lowest. The piston, together with the driving rod (the stud holder) is slowed down on contact with the welding stud and pushes the welding stud with decreasing force against the simultaneously increasing resilient forces restoring the stud holder into the welding position. The force exerted for this pushing thus declines during the pushing, whilst the force required for the pushing increases. In DE-OS 26 04 065 this disadvantageous characteristic is even intensified by the spring acting against the piston. On account of this characteristic the stud often does not reach the correct pre-calculated end position in the stud welding apparatus. In particular, when using arc ignition it is necessary that the position of the welding stud in relation to the welding face should be precisely fixed (in the order of magnitude of one tenth of a millimeter) in order to obtain welded joints having reproducible stability characteristics.

Furthermore, known stud welding apparatuses have the disadvantage that they are comparatively long, which is frequently referred to in the prior art. The extensive length of stud welding apparatuses jeopardises the use of these apparatuses for example in narrow spaces and also makes their use more difficult when manually operated.

The object of the present invention is therefore to provide a stud welding apparatus which makes precise insertion of the welding stud into the stud holder possible.

A further aspect of the object of the invention is to provide a stud welding apparatus which itself occupies only little space and which can be used in narrow spaces.

SUMMARY OF THE INVENTION

According to the present invention, stud welding apparatus for the automatic processing of welding studs comprising a housing, a spring-loaded stud holder which holds a welding stud in welding position by its resilient restoring force, a feed channel through which the stud is delivered into a substantially cylindrical space within the stud holder, and loading means which is movable relatively to the welding stud by a pneumatic piston and which presses the stud into the stud holder against the resilient restoring force, is characterised in that the loading means is pivotally attached about an axis fixed in relation to the housing, that between loading means and the pneumatic piston is disposed at least one lever, whereby the pivotal point of said lever on the loading means is spaced by a small distance from its axis of rotation and that loading means, lever and the movement of the pneumatic piston are coordinated so that loading means is pivotable between a loading position, in which the feed channel is cleared, and a position in which the loading means presses stud into the stud holder.

Stud welding apparatus in accordance with the invention has a completely different construction than the examples known from the prior art. Whereas in the prior art there is fundamentally a linear movement between stud holder and loading means, the present invention uses for the first time a turning loading means. Because of the gap between the toggle of the loading means and the point of engagement of the push rod a lever arrangement is provided which can be designed in a simple way so that the pushing force during the pushing of the stud is not decreasing but increasing, in contradiction to the situation in the prior art.

It is thus possible to position the stud very precisely in respect to the stud holder, since the force arising at the end of the pushing process can be precisely predetermined by coordinating the lever arrangement.

This predeterminable force gives rise to a further essential advantage which distinguishes the invention from the prior art. Due to the fact that the pushing force can be predetermined so that it is also high at the end of the pressing-in process when the resilient restoring forces of the stud holder are particularly high, the stud holder can be designed in such a way that the resilient restoring force is higher than previously known from the prior art. As a result of the higher resilient restoring force, effective higher contact pressures between the stud holder and the stud became possible when the stud is taken over by the stud holder. These higher contact pressures cause a greater resilient (hertzian) flattening between the stud holder and the stud and/or, according to material, also a greater plastic deformation. Thereby also enlarges the area over which the welding current is transmitted to the welding stud, which results in a plurality of advantages. On the one hand, if this is desired, higher welding currents can be employed without increasing the wear and tear on the stud holder. On the other hand, if the welding current is maintained at previous levels, the wear and tear of the stud holder is reduced.

This not only enhances the precision of the welding operation by the device in accordance with the invention, but the conditions of the welding current transmission are also improved.

According to one preferred embodiment of the invention; the movement of the pneumatic piston to the rotatable loading means is transmitted by three push rods. The first push rod is then directly arranged on the loading means and joined to the latter by hinges. A second push rod is joined by hinges to this first push rod and the second push rod is again joined by hinges to a third push rod. The third push rod is connected to the pneumatic piston and therefore moves in the same direction of movement as the piston. Since there can also be a displacement relative to the symmetrical plane of the piston, this motion in conjunction with the piston may be described as movement parallel with the piston motion.

According to another preferred embodiment rollers are carried by the toggles of these three push rods, which are disposed within a guide rail. This arrangement can achieve a precise and simple guiding of the first push rod. By appropriate selection of the dimensions of the push rods and in particular the angle between the first push rod and the second push rod, the kinetics of transmission of motion of this push rod arrangement can be controlled in a simple way.

According to a further preferred embodiment, the first push rod which is connected to the loading means is arranged perpendicular to the plane of motion of the pneumatic piston. This type of construction achieves a particularly dense and compact design of stud welding apparatus, which is substantially shorter than those known from the prior art. This also enables, studs to be welded for example in confined places of the automobile body, which cannot be welded by the stud welding apparatus known from the prior art.

In order that the present invention may be better understood, one preferred embodiment will now be described in greater detail by way of example with reference to the accompanying drawings in which:

BRIEF DESCRIPTION OF THE DRAWINGS

FIG. 1 is the front section of an exemplary embodiment of a stud welding apparatus in accordance with the invention; and FIG. 2 is an enlarged representation of the loading means of apparatus illustrated in FIG. 1.

FIG. 1, for reasons of clarity, depicts the front section only of an exemplary embodiment of a stud welding apparatus. A more complete layout of such a welding device is to be found in the publications mentioned above as prior art. Furthermore, the drawings do not show the spacer which determines the distance from the workpiece onto which the welding stud is to be welded.

DETAILED DESCRIPTION OF THE DRAWINGS

The stud welding apparatus depicted in FIG. 1, generally indicated by 1, is especially suitable for arc ignition. The stud welding apparatus 1 has a diagrammatically represented stud holder 2 at its front end. Said stud holder has gripping jaws 3, which resiliently open out when a welding stud 4 is introduced and grip the welding stud because of resilient restoring force thus generated.

The stud holder 2 surrounds an extensive cylindrical space 5.

Feed channel 6 ends in said cylindrical space 5 ends and its end can be connected to an automatic feeding device in a known way. The welding stud is moved along feed channel 6 into cylindrical space 5 by air pressure, i.e. pneumatically. The connection of feed channel 6 with the automatic feeding device (not shown) is made by a tube 7, which is joined to feed channel 6. Only a portion of the length of tube 7 is diagrammatically represented in FIG. 1.

A cylindrical slot 10 is provided in the stud holder, into which the loading means, hereafter denoted as loading lever 11, can be entered.

The loading lever 11 is pivotally mounted about an axis 12 and is able to be moved between the two extreme positions shown in FIG. 1.

When the loading lever 11 is moved in clockwise direction in FIG. 1, the loading lever withdraws from the cylindrical space 5 of the stud holder 3, so that a welding stud can be delivered into the cylindrical space.

The loading lever has a further axis 13, onto which the push rod 14 is hinged. In the folded-back condition, the axis 13 takes up the position denoted by 13'.

The axis 12 of the loading lever is attached to a rail arrangement 20, which at its end is securely connected to the stud welding apparatus 1. The rail arrangement constitutes guide rails for guiding a second push rod 15 and a third push rod 16. Between the first push rod 14 and the second push rod 15 a toggle 21 is provided, so that the two push rods can be turned by one another. On the axis is further arranged a roller 22, which guides the lower end of the push rod in the guide rail 20. The second push rod 15 is further provided at its lower end with a toggle 23, through which it is connected with third push rod 16. Also located on toggle 23 is a roller 24 by which this push rod is guided in guide rail 20. Push rod 16 is connected through a setting mechanism 30, which has a thread 31 and a screw 32, to a piston rod 33. Said piston rod 33 is sealed by a gasket 34 towards the stud welding apparatus and carries a pneumatic piston 35 which is displaceably guided inside a pneumatic cylinder 36. The guide rail arrangement, together with the push rods and the loading lever, is arranged on a structural member 40, which is connected to the other components of the stud welding apparatus by a sleeve nut 41.

The stud welding apparatus functions in the following way:

Prior to the start of the welding operation, the pneumatic piston is retracted pneumatically to its rearward position, i.e. towards its bottom dead centre (the top dead centre is the position shown in FIG. 1). By this means loading lever 11 swings downwardly, so that a welding stud can be introduced through feed channel 6 into cylindrical space 5 within the stud holder. The pneumatic piston is then extended forwardly, by which push rod 16 together with the toggle 23 (see FIG. 1) also move to the left. Due to the arrangement of the push rods in the guide rail, this movement results in first push rod 14 (FIG. 1) being moved upwardly, whereby the loading lever shifts from its open position into a closed position.

The forward section of the loading lever 11a comes into contact with welding stud 4 and pushes the latter against the resilient restoring force into the position shown in FIG. 1 and FIG. 2.

The kinetics of the pushing of the welding stud into the position shown in FIG. 1 and 2 may be influenced principally by two factors on this exemplary embodiment. Firstly, the length and angular position of second push rod 15 relative to third push rod 16 and first push rod 14 is of significance. Secondly, the point at which first push rod 14 is hinged to loading lever 11 is of significance.

By appropriately coordinating this geometric data relating to the displacement path and the displacement force of the piston as well as to the resilient restoring force of the stud holder, the desired kinetic requirements can be simply calculated.

I claim:

1. A stud welding apparatus comprising
   stud holder means including a cylindrical housing having gripping jaws at one end thereof,
   stud feed tube means communicating with said cylindrical housing at the other end thereof,
   axially extending slot means defined in said cylindrical housing, and
   loading means including
      a loading lever pivotally supported at one end for pivotal displacement from a retracted position remote from said cylindrical housing to an advanced position whereat the free end of said loading lever projects through said slot means between said gripping jaws and the end of said cylindrical housing which communicates with said stud feed tube, and engages a stud gripped by said gripping jaws and
      means for pivotally displacing said loading lever between said advanced and retracted positions.

2. A stud welding apparatus according to claim 1, wherein the pivotal support for the loading lever is selectively located so that the free end of said loading lever will move substantially axially when in engagement with a stud held in said gripping jaws.

3. A stud welding apparatus according to claim 2, wherein said pivotally displacing means comprises a piston having a rod displaceable in a direction parallel to the axis of said cylindrical housing.

* * * * *